Oct. 31, 1933.  W. A. STEVENS  1,933,230
ELECTRIC BRAKING
Filed June 30, 1930
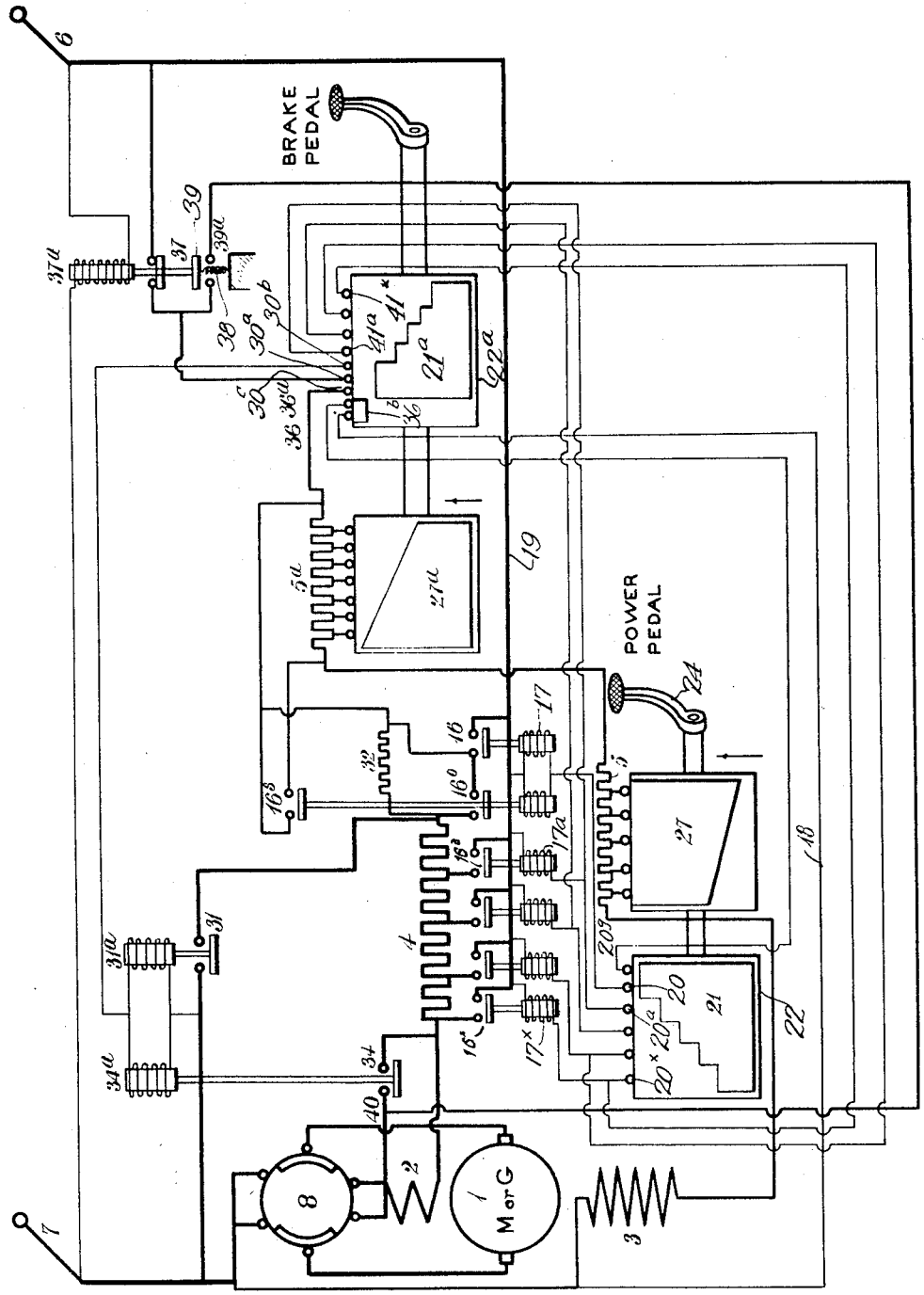
INVENTOR
William A. Stevens
by Richard E. Babcock
Attorney Patented Oct. 31, 1933

1,933,230

UNITED STATES PATENT OFFICE 1,933,230

ELECTRIC BRAKING

William Arthur Stevens, Maidstone, England, assignor to Guy Motors Limited, Wolverhampton, England, a company of Great Britain Application June 30, 1930, Serial No. 464,978, and in Great Britain August 20, 1929

5 Claims. (Cl. 172—179)

This invention relates to electric braking for electrically driven vehicles equipped with dynamo-electric machines of the kind capable of returning current to the line or battery at any speed at which the machine, acting as a generator, is able to supply current at a higher voltage than that of the line or battery.

The invention is particularly applicable to such vehicles in which the dynamo-electric machine is provided with series and shunt field windings, the series winding being in circuit with the armature winding and the shunt winding circuit being connected across the electric supply mains so that the machine is of the regenerative type, and the said series and shunt windings have in series therewith resistances that can be progressively cut in and out of circuit to meet the required varying conditions of running of the vehicle by controlling means actuated by a spring controlled pedal lever, the machine being also provided with current reversing switch mechanism and with means whereby the latter cannot be operated until the pedal lever is in its neutral or "off" position and the whole of the series resistance is in circuit with the series field winding and the circuit broken.

In the Patent 1,899,683, granted February 28, 1933, there is provided a control system for an electrically propelled vehicle in which a dynamo-electric machine is adapted for regenerative operation. In that patent the system of control comprises means for arresting the accelerating controller in a position to effect maximum regeneration when the machine is acting as a generator.

In my Patent 1,849,735, granted March 15, 1932, I provide a resistor so associated with the control system of a dynamo-electric machine, that when the supply circuit to the machine is inadvertently interrupted the resistor is automatically placed in series relation with the shunt field across the armature of the machine. The field excitation is thereby reduced to prevent the generated voltage of the machine from rising to a dangerous value.

In the invention to be described, the machine, acting as a generator excited by its shunt winding and with its armature circuit completed through the series starting resistance, is also enabled to supply current at a lower voltage than that of the supply, thus providing for electric braking at low speeds.

To make the circuits necessary for electric braking it will be necessary to connect the armature through the series starting resistance, to short-circuit the series field winding to neutralize the demagnetizing effect of the current when the machine is acting as a generator, and to connect the shunt field winding across the source of electrical supply so that, by varying the excitation of the field, any desired degree of electric braking can be obtained. It is also necessary to ensure that the electric braking circuits cannot be connected up at the same time as the driving circuits are in use.

For the purpose of more fully disclosing the nature of my invention, I shall describe the system of control diagrammatically illustrated in the accompanying drawing which embodies my invention in one form. It should be understood, however, that my invention is not limited to the particular system of control illustrated in the drawing, but is capable of various modifications.

Referring to the drawing, 1 is the armature of a dynamo-electric machine and 2 and 3 the series and shunt field windings respectively. 4 and 5 are the respective variable resistances for the series and shunt windings 2 and 3. 6 and 7 are the supply poles, and 8 represents the current reversing switch mechanism operated by the usual reversing lever. 16, $16^a$ . . . $16^x$ are contactors by means of which the variable starting resistance 4 can be progressively cut in or out of circuit. The windings 17, $17^a$ . . . $17^x$ of these contactors are arranged to be connected across circuit conductors 18, 19 through stationary contacts 20, $20^a$ . . . $20^x$ by a contact segment 21 on a rotary drum controller 22 operated by the pedal lever 24. Conductor 18 is connected to a stationary contact $20^y$. 32 is a supplementary high resistance inserted in the shunt circuit and normally adapted to be short-circuited by the contactor $16^o$ which closes at the same time as the remote contactor 16.

In the arrangement shown the contactor $16^o$ is provided with a linked supplementary switch $16^s$ which will open and close at the same time as the contactor switch. An auxiliary resistance $5^a$ is associated with the control system and is adapted to be connected in series relation with the field winding 3 during braking operation. The contacts of the switch $16^s$ are so connected as to short-circuit the auxiliary resistance $5^a$ upon the closure thereof.

In order to facilitate an understanding of the working of the system the driving and braking controller drums 22, $22^a$ are represented in developed form with their respective segments 21, $21^a$ and 27, $27^a$ shown and their direction of movement indicated by the arrows.

The braking shunt resistance $5^a$ is so arranged that its sections can be successively short-circuited by the segment 27ª of the braking controller drum 22ª through the action of the braking pedal which, when it is in its neutral position (nearest driver), will allow all resistance to be in circuit but when this pedal is depressed it will gradually short-circuit the braking shunt resistance.

The contacts 30ª and 30ᵇ are adapted to be short-circuited by a segment 21ª which is moved simultaneously with the brake controller drum 22ª. These contacts are so arranged with respect to the segment 21ª that when the brake pedal is depressed the contacts are shorted and remain so throughout the whole movement of the pedal. When the contacts 30ª and 30ᵇ are shorted a circuit is completed from the trolley pole 6 to the operating coil of the contactor 31 and to the trolley pole 7, thereby closing the contacts 31 and 31ᵇ.

For the purpose of short-circuiting the series field winding 2, a second contactor 34 is provided having its operating coil 34ª connected in parallel with the operating coil of the contactor 31 which closes the circuit of the armature through the series resistance. The switch of this second contactor will complete a short-circuit across the series winding 2 immediately the brake pedal is depressed.

If the machine is being driven and it becomes necessary to apply non-regenerative braking, the driving pedal 24 is allowed to come back to its neutral position and the driving contactors 16º, 16, 16ª ... 16ˣ will open. The driving shunt resistance 5 will now be short-circuited and the short-circuit across the braking shunt resistance 5ª removed by reason of the action of the contactor 16º to which switch 16ˢ is linked.

The braking pedal is now depressed resulting, first, in the closing of the circuits of the braking contactors 31, 31ᵇ and 34. The armature is now connected up through the series resistance by the closing of contactor 31, the exciting circuit of the field winding 3 is connected up by the simultaneous closing of the supplementary switch 31ᵇ and the series winding short-circuited by the closing of the contactor switch 34. Further forward movement of the braking pedal will cause the braking shunt resistance 5ª to be successively short-circuited by the inclined leading edge of the segment 27ª until full shunt field is obtained with maximum electric braking effect.

Removing the foot from the braking pedal will open the braking contactors 31, 31ᵇ and 34, the contacts 30ª and 30ᵇ being disconnected, and depressing the driving pedal 24 will successively close the driving contactors, 16, 16º, 16ª ... 16ˣ, the braking shunt resistance 5ª being short-circuited on the first contact being made, by the closing of the supplementary switch 16ˢ of contactor 16º and driving can now be carried on in the ordinary way.

In the event of the overhead circuit failing before the driver requires regenerative braking, the auxiliary switch having broken the shunt circuit the machine could not excite unless the contactors were excited. To provide for this contingency the shunt circuit is directly closed by the action of the brake pedal, and the segment 21ª on the braking controller drum will complete the electrical circuit between three switch fingers or contacts, of which contact 30ª is connected to the winding of contactor 31 which closes the circuit from trolley pole 7 to a position on the starting resistance 4. Contact 30ᵇ is electrically connected at 40 with the junction of the armature circuit with the series winding 2, and contact 30ᶜ to the junction 42 of the braking resistance 5ª and the supplementary resistance 32, thus completing the shunt circuit which will now be excited across the armature. Breaking the connection to the above mentioned junction will not break the circuit of the field winding 3 as it will still be completed through the supplementary resistance 32.

For preventing a short-circuit between the braking connections and the driving connections in the case of the braking pedal and the driving pedal being pushed forward at the same time the exciting circuit 18 is arranged to be broken by two switch fingers or contacts 36, 36ª situated in the braking shunt resistance box. A narrow insulated short-circuiting contact piece 36ᵇ carried on the braking shunt resistance drum 22ª will short-circuit these switch fingers so that the driving exciting circuit is completed when the brake pedal is in its extreme backward position (nearest driver) with the drum 22ª in the position shown in dotted lines. On the first movement of the braking pedal the above mentioned contact piece 36ᵇ will be removed from the switch fingers 36, 36ª and the driving exciting circuit 18 broken, this removal taking place before the contacts 30ª, 30ᵇ closing the exciting circuit of the braking contactors can be connected by the segment 21ª of the braking controller drum, so that it will be impossible to close the driving and braking contactors, by inadvertence or design, at the same time.

To ensure the continued excitation of the field winding 3 during braking operations should the electrical supply from overhead fail, from any cause, a contactor 37 is provided having a high resistance winding 37ª which is connected across trolley poles 6 and 7 and when excited, will close the circuit from the switch arm, against the action of a spring 38, to one contact 39 of a two-way switch. This switch arm is so arranged that should the high resistance winding lose its excitation, it will be brought in contact, by the action of the said spring with the other contact 39ª of the two-way switch.

The switch arm is connected to the circuit of the field winding 3 and its braking shunt resistance by means of contacts 30ª—30ᶜ and is brought into circuit with the electrical supply from trolley pole 6 when the contactor coil 37ª is excited. In this case the field winding 3 is separately excited.

When the contactor coil 37ª is not excited, as would happen if the electrical supply from overhead failed, the switch arm is brought, by the action of the spring 38, into electrical connection with the second contact 39ª of the two-way switch. This contact makes circuit at 40 with the junction of the armature circuit with the series winding 2. In this case the field winding 3 will be self-excited.

To reduce the resistance in series with the armature so as to ensure sufficient current through the armature to provide efficient electric braking at low speeds, additional contacts 41ª ... 41ˣ are provided which can be brought into contact with the braking shunt resistance short-circuiting segment 21ª of drum 22ª after the shunt resistance is completely short-circuited. These additional contacts are electrically connected, respectively, to contacts 20ª ... 20ˣ of the governing controller 22, so that the operating coils 17ª ... 17ˣ of the contactors 16ª ... 16ˣ which successively short-circuit sections of the resistance 4, can be completed in the order given, thus reducing this resistance down to a short-circuit, if required, at the full forward position of the braking pedal.

The circuits to 20$^a$ ... 20$^x$ already mentioned, may be closed by a stepped extension 21$^b$ of the segment 21$^a$ which closes the circuit of the operating coils 31$^a$, 34$^a$ of the braking contactors above described, as the short-circuiting piece will have the same polarity as the drum which short-circuits the shunt resistance.

I claim,

1. In a system of control, the combination with a supply circuit, a dynamo-electric machine having an armature, a series field winding, a shunt field winding, a resistor in series relation with said armature, a resistor in series relation with said shunt field winding, and a controller adapted to vary said armature resistance and said shunt field resistance to effect acceleration of said machine, of means comprising a braking contactor for establishing a braking circuit and a shunt field circuit through a second shunt field resistor, and a second controller adapted to effect the operation of said means and to control said braking circuit.

2. In a system of electric braking for an electrically driven vehicle, a dynamo-electric machine having an armature and a shunt field winding, a resistor in series relation with said armature, a resistor in series relation with said shunt field winding, a controller adapted to vary said resistances to effect acceleration of said machine, means comprising a braking contactor for establishing a braking circuit through said armature resistor, and means comprising a braking controller for establishing a shunt field circuit through a second shunt field resistor and actuating said braking contactor, said braking contactor being operable to vary the field excitation of said machine during dynamic braking operation thereof.

3. In a system of electric braking for an electrically propelled vehicle, a dynamo-electric machine, a multi-position controller adapted to effect acceleration of said machine, a braking controller adapted to establish a braking circuit for said machine and a shunt field circuit through a variable resistor, said braking controller being operable to vary said resistance to control the field excitation of said machine during braking operation, and means associated with said braking controller for rendering said first mentioned controller inoperative during such braking operation.

4. In a system of electric braking for an electrically propelled vehicle, a dynamo-electric machine having an armature and a shunt field winding, a resistor in series relation with said armature, a controller for varying said resistance to accelerate said machine, a braking controller adapted to effect means for establishing a braking circuit for said machine through said armature resistor, means associated with said braking controller adapted to render said first mentioned controller inoperative, and means operable by said braking controller adapted to vary the resistance of said braking circuit.

5. In a system of electric braking for an electrically propelled vehicle, a dynamo-electric machine having an armature and a shunt field winding, a resistor in series relation with said armature, a resistor in series relation with said field winding, a controller for varying said resistances to accelerate said machine, a braking controller adapted to effect means for establishing a braking circuit for said machine through said armature resistor, said braking controller being operable to establish a shunt field circuit through a second shunt field resistor, means associated with said braking controller adapted to vary the resistance of said braking circuit, and means for varying the resistance of said second shunt field circuit.

WILLIAM ARTHUR STEVENS.